(12) United States Patent
Dockter et al.

(10) Patent No.: US 12,325,829 B2
(45) Date of Patent: Jun. 10, 2025

(54) SOLID OXIDE AND CHEMICALLY-TREATED SOLID OXIDE CATALYSTS FOR THE PYROLYSIS OF POLYETHYLENE

(71) Applicant: Chevron Phillips Chemical Company LP, The Woodlands, TX (US)

(72) Inventors: David W. Dockter, The Woodlands, TX (US); Max P. McDaniel, Bartlesville, OK (US); Kathy S. Clear, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

(21) Appl. No.: 18/916,835

(22) Filed: Oct. 16, 2024

(65) Prior Publication Data

US 2025/0034456 A1 Jan. 30, 2025

Related U.S. Application Data

(63) Continuation of application No. 18/433,580, filed on Feb. 6, 2024, which is a continuation of application
(Continued)

(51) Int. Cl.
*C10G 1/08* (2006.01)
*B01J 21/12* (2006.01)
(Continued)

(52) U.S. Cl.
CPC .............. *C10G 1/086* (2013.01); *B01J 21/12* (2013.01); *B01J 27/053* (2013.01); *B01J 27/12* (2013.01);
(Continued)

(58) Field of Classification Search
CPC . B01J 21/12; B01J 27/053; B01J 27/12; B01J 35/40; B01J 37/0219; C10G 1/086;
(Continued)

(56) References Cited

U.S. PATENT DOCUMENTS 4,229,586 A 10/1980 Ward
5,223,470 A 6/1993 Bouwman
(Continued)

FOREIGN PATENT DOCUMENTS

CN 111662739 A 9/2020
WO 2008148113 A1 12/2008
(Continued)

OTHER PUBLICATIONS

Brunauer, et al., "Adsorption of Gases in Multimolecular Layers", Journal of the Ameri Chemical Society 1938, vol. 60, pp. 309-319.
(Continued)

*Primary Examiner* — Brian A McCaig
(74) *Attorney, Agent, or Firm* — Merchant & Gould P.C.

(57) ABSTRACT

Pyrolysis processes comprise contacting a waste polyolefin with a solid catalyst at a pyrolysis temperature to form a pyrolysis product containing $C_1$-$C_{10}$ hydrocarbons. In some instances, the solid catalyst can be a silica-coated alumina, a fluorided silica-coated alumina, or a sulfated alumina, while in other instances, the solid catalyst can be any suitable solid oxide or chemically-treated solid oxide that is characterized by a d50 average particle size from 5 to 12 μm and a particle size span from 0.7 to 1.7. Hydrocarbon compositions are formed from the pyrolysis of waste polyolefins with specific amounts of methane and higher carbon number hydrocarbons.

20 Claims, 3 Drawing Sheets

Related U.S. Application Data

No. 18/315,573, filed on May 11, 2023, now Pat. No. 11,920,089.

(51) Int. Cl.
  *B01J 27/053* (2006.01)
  *B01J 27/12* (2006.01)
  *B01J 35/40* (2024.01)
  *B01J 37/02* (2006.01)
  *C10G 1/10* (2006.01)

(52) U.S. Cl.
  CPC ........... *B01J 35/40* (2024.01); *B01J 37/0219* (2013.01); *C10G 1/10* (2013.01); *C10G 2300/1003* (2013.01); *C10G 2300/70* (2013.01); *C10G 2400/08* (2013.01); *C10G 2400/22* (2013.01)

(58) Field of Classification Search
  CPC .............. C10G 1/10; C10G 2300/1003; C10G 2300/70; C10G 2400/08; C10G 2400/22
  See application file for complete search history.

(56) References Cited

U.S. PATENT DOCUMENTS

| | | | |
|---|---|---|---|
| 6,388,017 | B1 | 5/2002 | McDaniel |
| 7,294,599 | B2 | 11/2007 | Jensen |
| 7,601,665 | B2 | 10/2009 | McDaniel |
| 7,884,163 | B2 | 2/2011 | McDaniel |
| 8,309,485 | B2 | 11/2012 | Yang |
| 8,536,391 | B2 | 9/2013 | Small |
| 8,623,973 | B1 | 1/2014 | McDaniel |
| 8,703,886 | B1 | 4/2014 | Yang |
| 8,916,494 | B2 | 12/2014 | McDaniel |
| 9,023,959 | B2 | 5/2015 | McDaniel |
| 10,246,528 | B2 | 4/2019 | McDaniel |
| 10,919,996 | B2 | 2/2021 | McDaniel |
| 11,124,586 | B1 * | 9/2021 | McDaniel ............. C08F 210/16 |
| 11,473,017 | B1 | 10/2022 | Horlacher |
| 11,479,726 | B2 | 10/2022 | Abbott |
| 11,920,089 | B1 | 3/2024 | Dockter |
| 2004/0006250 | A1 | 1/2004 | Mathys |
| 2006/0036122 | A1 | 2/2006 | Asami |
| 2007/0277552 | A1 | 12/2007 | Fujimoto |
| 2007/0282019 | A1 | 12/2007 | Fujimoto |
| 2008/0246704 | A1 | 10/2008 | Nafis |
| 2009/0042717 | A1 | 2/2009 | Fujimoto |
| 2020/0362248 | A1 | 11/2020 | Cartolano |
| 2021/0061972 | A1 | 3/2021 | Nagy |

FOREIGN PATENT DOCUMENTS

| | | |
|---|---|---|
| WO | 2017052860 A1 | 3/2017 |
| WO | 2022015971 A1 | 1/2022 |
| WO | 2022096782 A1 | 5/2022 |

OTHER PUBLICATIONS

Cotton, F. Albert, et al., "Advanced Inorganic Chemistry," Sixth Edition, cover page, title page, pp. ix-x, and book description, Mar. 30, 1999, John Willey & Sons, Inc.

GW Huber et al., The Chemistry and Kinetics of Polyethylene Pyrolysis: A Process to Produce Fuels and Chemicals, Chem Sus Chem, 13, 1764-1774, 2020.

Halsey, "Physical Adsorption on Non-Uniform Surfaces," Journal Chem. Phys., vol. 16, Mar. 9, 1948, pp. 931-937.

Hawley's Condensed Chemical Dictionary, Eleventh Edition, cover page, contents page, pp. 862-863, Van Nostrand Reinhold Company.

IUPAC Compendi ninology, 2nd Ed. 1997, pp. 1-1670.

Miskolczi, et al., "Fuels production by pyrolysis of waste plastics from agricultural and packaging sectors in a pilot scale reactor", Fuel Processing Technology (2009), 90(7-8), 1032-1040.

Miskolczi, N. et al. "Preparation And Application Of Metal Loaded ZSM-5 and Y-Zeolite Cataly 10-Catalytic Pyrolysis Of Real End Of Life Vehicle Plastics Waste", Journal Of The Energy Institute, 92(1): p. 118-127, Feb. 2019. https://doi.org/10.1016/j.joel.2017.10.017.

Santos, BPS, et. al. "Petrochemical Feedstock From Pyrolysis Of Waste Polyethylene And Polypropylene Using Different Catalysts". Fuel 215: p. 515-521, Mar. 1, 2018. https://doi.org/10.1016/j. fuel.2017.11.104.

SM Fakhrhoseini, Predicting Pyrolys Products of PE, PP, and PET Using NRTL Activity Coefficient Model Journal of Chemistry, 2013, 1-4.

Partial Internation Search Report issued in corresponding PCT Application No. PCT/US2024/028494, mailed on Oct. 16, 2024, 2 pp.

\* cited by examiner

000

SOLID OXIDE AND CHEMICALLY-TREATED SOLID OXIDE CATALYSTS FOR THE PYROLYSIS OF POLYETHYLENE

This application is a continuation application of co-pending U.S. patent application Ser. No. 18/433,580, filed on Feb. 6, 2024, now U.S. Pat. No. 12,152,199, which is a continuation application of co-pending U.S. patent application Ser. No. 18/315,573, filed on May 11, 2023, now U.S. Pat. No. 11,920,089, the disclosures of which are incorporated herein by reference in their entirety.

FIELD OF THE INVENTION

The present disclosure generally is directed to solid catalysts that promote the pyrolysis of plastic waste (such as waste polyolefins), to related pyrolysis processes, and to hydrocarbon compositions formed from the catalyzed pyrolysis of polyethylene.

BACKGROUND OF THE INVENTION

Solid catalysts can be utilized to promote the pyrolysis of waste polyolefins, such as polyethylene. However, the performance of a particular catalyst in a pyrolysis reaction can depend upon many variables, and likewise, the distribution of pyrolysis products also is impacted by the solid catalyst. Given these factors, there is a need for improved solid catalysts for the pyrolysis of polymeric materials, which in turn produce pyrolysis products that are suitable for use in desirable end-use applications. Accordingly, it is to these ends that the present invention is generally directed.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Hydrocarbon compositions are described herein. A first composition consistent with this disclosure can comprise from 45 to 70 mol % $C_3$-$C_4$ hydrocarbons and less than or equal to 12 mol % methane. A second composition provided herein can comprise from 40 to 60 mol % $C_5$-$C_8$ hydrocarbons and less than or equal to 6 mol % methane. A third composition provided herein can comprise from 15 to 30 mol % $C_9$-$C_{10}$ hydrocarbons and less than or equal to 6 mol % methane.

Also encompassed herein are catalysts and catalyst compositions, and an illustrative and non-limiting example of a catalyst can comprise a solid oxide and/or a chemically-treated solid oxide, and the catalyst can be characterized by a d50 average particle size in a range from 5 to 12 μm and a particle size span ((d90−d10)/d50) in a range from 0.7 to 1.7. An illustrative and non-limiting example of a catalyst composition can comprise a catalyst comprising a solid oxide and/or a chemically-treated solid oxide and a polyethylene, and from 5 to 50 wt. % of the composition can be the catalyst. The catalyst composition can be prepared by any suitable method, such as by melting the polyethylene in an inert atmosphere, combining the catalyst comprising the solid oxide and/or the chemically-treated solid oxide with the polyethylene to form a mixture, and cooling the mixture to form the catalyst composition.

Pyrolysis processes also are described herein. Such processes can comprise contacting a waste polyolefin, such as a waste polyolefin comprising polyethylene, with any of the catalysts disclosed herein at a pyrolysis temperature to form a pyrolysis product containing $C_1$-$C_{10}$ hydrocarbons. While not limited thereto, the catalyst can comprise a silica-coated alumina, a fluorided silica-coated alumina, a sulfated alumina, or any combination thereof.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
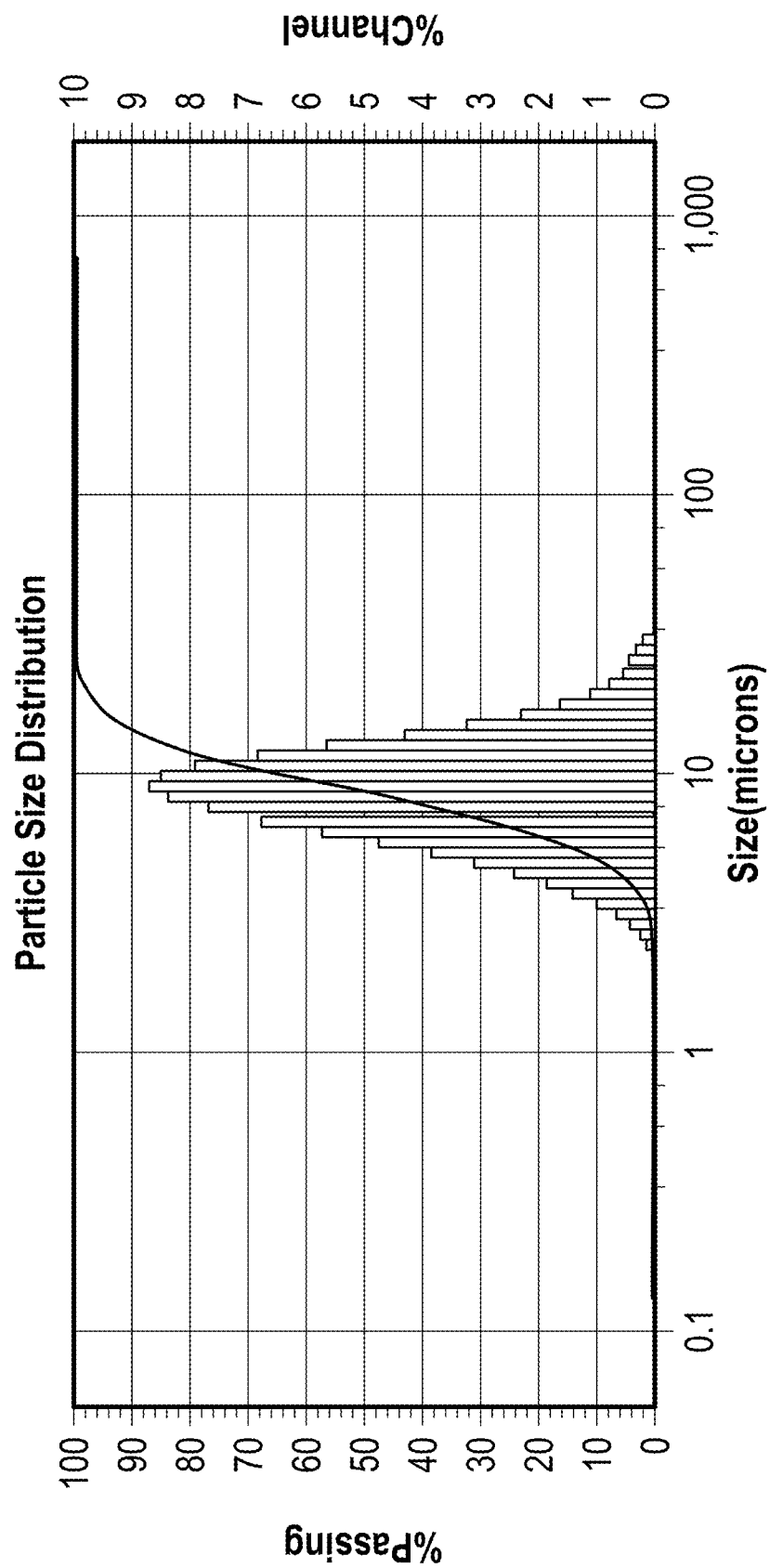
FIG. 1 presents a plot of the particle size distribution of the fluorided silica-coated alumina catalyst of Example 1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the catalysts, compositions, and/or methods described herein are contemplated with or without explicit description of the particular combination. Additionally, unless explicitly recited otherwise, any aspect and/or feature disclosed herein can be combined to describe inventive features consistent with the present disclosure.

Generally, groups of elements are indicated using the numbering scheme indicated in the version of the periodic table of elements published in *Chemical and Engineering News*, 63 (5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The terms "a," "an," "the," etc., are intended to include plural alternatives, e.g., at least one, unless otherwise specified.

The terms "contacting" and "combining" are used herein to describe compositions and processes/methods in which the materials are contacted or combined together in any order, in any manner, and for any length of time, unless otherwise specified. For example, the materials can be blended, mixed, slurried, dissolved, reacted, treated, impregnated, compounded, or otherwise contacted or combined in some other manner or by any suitable method or technique.

The term "hydrocarbon" refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon).

The term "waste polyolefin" is used herein generically to include olefin homopolymers, copolymers, terpolymers, and so forth, and mixtures thereof. A copolymer is derived from an olefin monomer and one olefin comonomer, while a terpolymer is derived from an olefin monomer and two olefin comonomers. Accordingly, "waste polyolefin" encompasses copolymers, terpolymers, etc., derived from any olefin monomer and comonomer(s) disclosed herein. Similarly, a "waste polyolefin" encompasses polyethylene homopolymers, polypropylene homopolymers, polyethylene copolymers, polypropylene copolymers, polyethylene terpolymers, and the like.

The term "polyethylene" is used herein generically to encompass ethylene-based polymers, including ethylene homopolymers, ethylene-based copolymers, ethylene-based terpolymers, and the like, as well as alloys and blends thereof. Therefore, "polyethylene" includes ethylene homopolymers, ethylene copolymers (e.g., ethylene/α-olefin copolymers such as ethylene/1-butene copolymers, ethylene/1-hexene copolymers, ethylene/1-octene copolymers, etc.), ethylene terpolymers, and the like, as well as blends or mixtures thereof, and this includes, but is not limited to, polymers often referred to in the art as LDPE (low density polyethylene), LLDPE (linear low density polyethylene), and HDPE (high density polyethylene), among others.

The term "polypropylene" is used herein generically to encompass propylene-based polymers, including propylene homopolymers, propylene-based copolymers, propylene-based terpolymers, and the like, as well as alloys and blends thereof. Therefore, "polypropylene" includes propylene homopolymers, propylene-based random copolymers, propylene-based block copolymers (e.g., ethylene/propylene copolymers), and the like, as well as blends or mixtures thereof.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, a solid catalyst disclosed herein can have or can be characterized by various d50 average particles sizes in aspects of this invention. By a disclosure that the d50 of the solid catalyst is in a range from 5 to 12 μm, the intent is to recite that the d50 can be any particle size in the range and, for example, can include any range or combination of ranges from 5 to 12 μm, such as from 5 to 11 μm, from 6 to 12 μm, from 6 to 11 μm, from 7 to 10 μm, or from 8 to 9 μm, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods and materials similar or equivalent to those described herein can be used in the practice or testing of the invention, the typical methods and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

The present disclosure generally relates to catalysts and catalyst compositions, methods for using the catalysts and catalyst compositions to promote the pyrolysis of waste polyolefins (such as polyethylene), and hydrocarbon compositions produced from the catalyzed pyrolysis reactions.

One objective of this invention is to develop catalysts and catalyst compositions with high catalytic activity for the pyrolysis of waste polyolefins comprising polyethylene, such that pyrolysis reaction temperatures unexpectedly can be lowered by at least 75° C., and in some cases, from 100 to 200° C., or more. Another objective of this invention is to produce useful hydrocarbon compositions from the pyrolysis of waste polyolefins comprising polyethylene, particularly at lower reaction temperatures where relatively more higher carbon number products and less methane are formed.

Hydrocarbon Compositions

A first composition disclosed herein can comprise from 45 to 70 mol % $C_3$-$C_4$ hydrocarbons and less than or equal to 12 mol % methane. This first composition can be described as an LNG composition. In one aspect, the first composition can comprise from 46 to 68 mol % $C_3$-$C_4$ hydrocarbons, while in another aspect, from 48 to 67 mol % $C_3$-$C_4$ hydrocarbons, and in yet another aspect, from 50 to 65 mol % $C_3$-$C_4$ hydrocarbons, and in still another aspect, from 50 to 62 mol % $C_3$-$C_4$ hydrocarbons. It is beneficial for the first composition to contain minimal amounts of methane, such as less than or equal to 10 mol %, less than or equal to 8 mol %, or less than or equal to 6 mol % of methane. Accordingly, typical ranges for the amount of methane in the first composition include from 0.5 to 11 mol %, from 1 to 11 mol %, or from 1 to 8 mol % methane, although not limited thereto.

The first composition also can contain $C_2$ hydrocarbons, $C_5$-$C_8$ hydrocarbons, and $C_9$-$C_{10}$ hydrocarbons. Generally, there are only minor amounts of $C_5$-$C_8$ hydrocarbons and $C_9$-$C_{10}$ hydrocarbons in the first composition. For instance, the first composition can contain from 4 to 12 mol % of $C_5$-$C_8$ hydrocarbons, such as from 5 to 11 mol % or from 6 to 10 mol % $C_5$-$C_8$ hydrocarbons, although not limited thereto. Likewise, the first composition can contain less than or equal to 5 mol % $C_9$-$C_{10}$ hydrocarbons, and more often, less than or equal to 3 mol %, less than or equal to 2 mol %, or less than or equal to 1 mol % $C_9$-$C_{10}$ hydrocarbons. The amount of $C_2$ hydrocarbons in the first composition typically ranges from 22 to 39 mol %, and illustrative ranges include from 23 to 38 mol %, from 24 to 37 mol %, or from 25 to 36 mol % $C_2$ hydrocarbons, although not being limited thereto.

A second composition disclosed herein can comprise from 40 to 60 mol % $C_5$-$C_8$ hydrocarbons and less than or equal to 6 mol % methane. This second composition can be described as a gasoline composition. In one aspect, the second composition can comprise from 40 to 58 mol % $C_5$-$C_8$ hydrocarbons, while in another aspect, from 42 to 60 mol % $C_5$-$C_8$ hydrocarbons, and in yet another aspect, from 42 to 58 mol % $C_5$-$C_8$ hydrocarbons, and in still another aspect, from 45 to 57 mol % $C_5$-$C_8$ hydrocarbons. It is beneficial for the second composition to contain minimal amounts of methane, such as less than or equal to 5 mol %, less than or equal to 4 mol %, or less than or equal to 3 mol % of methane. Accordingly, typical ranges for the amount of methane in the second composition include from 0.5 to 6 mol %, from 1 to 6 mol %, or from 1 to 5 mol % methane, although not limited thereto.

The second composition also can contain $C_2$ hydrocarbons, $C_3$-$C_4$ hydrocarbons, and $C_9$-$C_{10}$ hydrocarbons, but these are present in minor amounts as compared to the $C_5$-$C_8$ hydrocarbons. For instance, the second composition can contain from 1 to 12 mol % $C_2$ hydrocarbons, such as from 2 to 10 mol %, from 3 to 10 mol %, or from 4 to 9 mol % $C_2$ hydrocarbons, although not limited thereto. The amount of $C_3$-$C_4$ hydrocarbons in the second composition typically ranges from 12 to 31 mol %, and illustrative ranges include from 15 to 22 mol % or from 15 to 20 mol % $C_3$-$C_4$ hydrocarbons. Likewise, the second composition can contain from 15 to 30 mol % $C_9$-$C_{10}$ hydrocarbons, and more often, from 17 to 28 mol %, from 17 to 27 mol %, or from 18 to 25 mol % $C_9$-$C_{10}$ hydrocarbons.

A third composition disclosed herein can comprise from 15 to 30 mol % $C_9$-$C_{10}$ hydrocarbons and less than or equal to 6 mol % methane. This third composition can be described as an aviation fuel composition. In one aspect, the third composition can comprise from 16 to 29 mol % $C_9$-$C_{10}$ hydrocarbons, while in another aspect, from 17 to 28 mol % $C_9$-$C_{10}$ hydrocarbons, and in yet another aspect, from 17 to 27 mol % $C_9$-$C_{10}$ hydrocarbons, and in still another aspect, from 18 to 25 mol % $C_9$-$C_{10}$ hydrocarbons. It is beneficial for the third composition to contain minimal amounts of methane, such as less than or equal to 5 mol %, less than or equal to 4 mol %, or less than or equal to 3 mol % of methane. Accordingly, typical ranges for the amount of methane in the third composition include from 0.5 to 6 mol %, from 0.5 to 5 mol %, or from 1 to 4 mol % methane, although not limited thereto.

The third composition also can contain $C_2$ hydrocarbons, $C_3$-$C_4$ hydrocarbons, and $C_5$-$C_8$ hydrocarbons. The $C_2$ hydrocarbons are present in minor amounts in the third composition, such as from 1 to 12 mol % $C_2$ hydrocarbons, and more often, from 1 to 10 mol %, from 2 to 9 mol %, or from 2 to 8 mol % $C_2$ hydrocarbons. The amount of $C_3$-$C_4$ hydrocarbons in the third composition can vary over a fairly wide range, such as from 15 to 50 mol %, from 15 to 48 mol %, or from 16 to 46 mol % $C_3$-$C_4$ hydrocarbons, and the like. Similarly, the amount of $C_5$-$C_8$ hydrocarbons in the third composition also can vary over a fairly wide range, such as from 25 to 60 mol %, from 28 to 58 mol %, or from 30 to 56 mol % $C_5$-$C_8$ hydrocarbons, and the like.

The first hydrocarbon composition, the second hydrocarbon composition, and the third hydrocarbon composition are predominantly unsaturated hydrocarbons (e.g., alkenes) and aliphatic hydrocarbons (e.g., not aromatic). Excluding methane, the first composition, the second composition, and the third composition—independently—can comprise at least 85 mol % alkenes (e.g., mono-alkenes and/or di-alkenes), and more often, can comprise at least 90 mol %, at least 95 mol %, at least 97 mol %, at least 98 mol %, or at least 99 mol % alkenes. As the amount of hydrogen present in the respective composition or present during pyrolysis (described further below), the amount of alkanes versus alkenes will increase.

Additionally or alternatively, the first composition, the second composition, and the third composition—independently—can contain less than or equal to 2 mol % aromatic compounds. In some aspects, the amount of aromatic compounds in the first composition, the second composition, and the third composition—independently—can be less than or equal to 1 mol %; alternatively, less than or equal to 0.5 mol %; or alternatively, less than or equal to 0.1 mol % aromatic compounds. As would be recognized by those of skill in the art, the total of any of the above described hydrocarbon components in the first, second, and third compositions does not exceed 100 mol %.

Catalysts and Catalyst Compositions

A solid catalyst is provided in an aspect of the present invention. The catalyst can comprise a solid oxide and/or a chemically-treated solid oxide, and the catalyst can be characterized by a d50 average particle size in a range from 5 to 12 μm and a particle size span ((d90−d10)/d50) in a range from 0.7 to 1.7. This catalyst also can be referred to herein as a catalyst composition.

Other suitable ranges for the d50 average particle size of the catalyst include, but are not limited to, from 5 to 11 μm, from 6 to 12 μm, from 6 to 11 μm, from 7 to 10 μm, or from 8 to 9 μm, and the like, and other suitable ranges for the particle size span include, but are not limited to, from 0.7 to 1.5, from 0.8 to 1.4, from 0.9 to 1.3, or from 1 to 1.2, and the like.

The catalyst also can be characterized by a ratio of d90/d10 in a range from 2 to 5 in one aspect, from 2 to 4 in another aspect, from 2.5 to 4 in yet another aspect, and from 2.5 to 3.5 in still another aspect. Additionally or alternatively, the catalyst can have a d10 particle size in a range from 2 to 8 μm, such as from 3 to 7 μm, from 4 to 6 μm, or from 4.5 to 5.5 μm. Additionally or alternatively, the catalyst can be characterized by a ratio of d90/d50 in a range from 1.2 to 4, such as from 1.3 to 3, from 1.4 to 2.5, from 1.4 to 2, or from 1.5 to 1.9.

Solid catalysts described herein generally can refer to solid oxides and chemically-treated solid oxides or like material as disclosed, for instance, in U.S. Pat. Nos. 8,536,391 and 10,919,996. In certain aspects, the solid oxide can comprise oxygen and at least one element selected from Group 2, 3, 4, 5, 6, 7, 8, 9, 10, 11, 12, 13, 14, or 15 of the periodic table, or comprise oxygen and at least one element selected from the lanthanide or actinide elements; alternatively, the solid oxide can comprise oxygen and at least one element selected from Group 4, 5, 6, 12, 13, or 14 of the periodic table, or comprise oxygen and at least one element selected from the lanthanide elements. (See: Hawley's Condensed Chemical Dictionary, 11th Ed., John Wiley & Sons; 1995; Cotton, F. A.; Wilkinson, G.; Murillo; C. A.; and Bochmann; M. Advanced Inorganic Chemistry, 6th Ed., Wiley-Interscience, 1999.) In some aspects, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr; alternatively, the inorganic oxide can comprise oxygen and at least one element selected from Al, B, Si, Ti, P, Zn or Zr.

In an aspect, the solid oxide can comprise $Al_2O_3$, $B_2O_3$, BeO, $Bi_2O_3$, CdO, $CO_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, mixed oxides thereof, and combinations thereof. In certain aspects, the solid oxide can comprise a silica, an alumina, a silica-alumina, a silica-coated alumina, an aluminum phosphate, an aluminophosphate, a heteropolytungstate, a titania, a zirconia, a magnesia, a boria, a zinc oxide, a mixed oxide thereof, or any combination thereof. In other aspects, the solid oxide can comprise a silica-coated alumina.

The silica content of the silica-coated alumina, while not being necessarily limited to, often ranges from 10 to 80 wt. %, based on the weight of the silica-coated alumina. More often, the silica-coated alumina contains from 10 to 60 wt. % silica in one aspect, from 10 to 40 wt. % silica in another aspect, from 20 to 50 wt. % silica in yet another aspect, and from 20 to 35 wt. % silica in still another aspect. These percentages are based on the weight of the silica-coated alumina.

Alternatively, or additionally, solid catalysts can comprise chemically-treated solid oxides. In one aspect and any aspect of this disclosure, the solid catalyst can comprise a chemically-treated solid oxide comprising a solid oxide treated with at least one electron-withdrawing anion, wherein the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

The solid oxide material can be treated with a source of halide ion, sulfate ion, or a combination thereof. In one aspect, the solid oxide material can be treated with a source of sulfate (termed a sulfating agent), a source of phosphate (termed a phosphating agent), a source of iodide ion (termed an iodiding agent), a source of bromide ion (termed a bromiding agent), a source of chloride ion (termed a chloriding agent), a source of fluoride ion (termed a fluoriding agent), or any combination thereof, and calcined to provide the chemically-treated solid oxide.

In certain aspects, the solid catalyst can comprise a chemically-treated solid oxide comprising a solid oxide treated with an electron-withdrawing anion, wherein the solid oxide is selected from a silica, an alumina, a silica-alumina, a silica-coated alumina, an aluminum phosphate, a heteropolytungstate, a titania, a zirconia, a magnesia, a boria, a zinc oxide, a mixed oxide thereof, or a mixture thereof, and the electron-withdrawing anion is selected from fluoride, chloride, bromide, phosphate, triflate, bisulfate, sulfate, fluorophosphate, fluorosulfate, or any combination thereof. Thus, in certain aspects wherein the solid catalyst comprises a chemically-treated solid oxide, the chemically-treated solid oxide can comprise a fluorided alumina, a chlorided alumina, a bromided alumina, a sulfated alumina, a phosphated alumina, a fluorided silica-alumina, a chlorided silica-alumina, a bromided silica-alumina, a sulfated silica-alumina, a phosphated silica-alumina, a fluorided silica-zirconia, a chlorided silica-zirconia, a bromided silica-zirconia, a sulfated silica-zirconia, a fluorided silica-titania, a fluorided silica-coated alumina, a sulfated silica-coated alumina, a phosphated silica-coated alumina, or any combination thereof. In certain aspects, the chemically-treated solid oxide can comprise a sulfated alumina and/or a fluorided silica-coated alumina. Additional information on chemically-treated solid oxides can be found in, for instance, U.S. Pat. Nos. 7,294,599, 7,601,665, 7,884,163, 8,309,485, 8,623,973, and 8,703,886.

While not being limited thereto, the electron-withdrawing anion content (e.g., fluorine or sulfate) of the chemically-treated solid oxide can range from 1 to 25 wt. %, such as from 2 to 20 wt. %, from 3 to 15 wt. %, from 3 to 12 wt. %, or from 4 to 10 wt. %. In many instances, the fluorided silica-coated alumina described herein can contain from 1 to 25 wt. % F, such as from 2 to 10 wt. % F, or from 3 to 7 wt. % F, and the like. These weight percentages are based on the weight of the fluorided silica-coated alumina. Analogously, the sulfated alumina described herein often can contain from 1 to 25 wt. % sulfate, such as from 5 to 25 wt. % sulfate, or from 10 to 25 wt. % sulfate, and the like. These weight percentages are based on the weight of the sulfated alumina.

The solid oxide can be calcined or uncalcined; alternatively, calcined; or alternatively, uncalcined. In aspects where the solid catalyst is a chemically-treated solid oxide, the solid oxide can be calcined prior to, during, or after the solid oxide compound is contacted with the electron-withdrawing anion source. Calcining of the solid oxide or treated solid oxide is generally conducted in an ambient atmosphere; alternatively, in a dry ambient atmosphere. The solid oxide or chemically-treated solid oxide can be calcined at a temperature from 200° C. to 900° C.; alternatively, from 300° C. to 800° C.; alternatively, from 400° C. to 700° C.; or alternatively, from 350° C. to 550° C. The period of time at which the solid oxide or chemically-treated solid oxide is maintained at the calcining temperature can be from 1 min to 100 hr; alternatively, from 1 hr to 50 hr; alternatively, from 3 hr to 20 hr; or alternatively, from 1 hr to 10 hr.

In particular aspects wherein the solid catalyst comprises a solid oxide, the solid oxide often can comprise a silica-coated alumina. Alternatively, in particular aspects wherein the solid catalyst comprises a chemically-treated solid oxide, the chemically-treated solid oxide can comprise a fluorided silica-coated alumina or a sulfated alumina (or a mixture thereof).

Typically, the solid oxide catalyst or chemically-treated solid oxide catalyst can have a pore volume greater than or equal to 0.1 ml/g, or greater than or equal to 0.5 mL/g. For instance, the catalyst pore volume often can range from 0.4 to 2.5 mL/g, from 0.5 to 2 mL/g, from 0.7 to 1.8 mL/g, or from 1 to 2 mL/g, and the like. The solid catalysts disclosed herein also can be characterized by a BET surface area in a range from 150 to 800 $m^2/g$, and representative ranges for the BET surface area include from 200 to 600 $m^2/g$, from 200 to 400 $m^2/g$, or from 250 to 500 $m^2/g$, and the like.

Although the catalysts disclosed herein generally are of a very fine particle size (e.g., a d50 average particle size of 5 to 12 μm), larger particle size catalysts also are contemplated herein. For example, the d50 average particle size can range from 5 μm up to 150 μm, such as from 5 to 50 μm, from 5 to 15 μm, from 10 to 100 μm, or from 10 to 40 μm, and so forth.

In accordance with an aspect of this invention, the catalyst can further contain (e.g., can be impregnated with) a transition metal such as nickel or cobalt at any suitable loading. When present, the amount of nickel (or cobalt) often ranges from 0.1 to 15 wt. %, from 0.2 to 10 wt. %, or from 0.5 to 5 wt. %, based on the total weight of the catalyst.

Unexpectedly, the disclosed catalysts can initiate pyrolysis reactions at very low temperatures. In one aspect, the catalyst comprising a solid oxide and/or a chemically-treated solid oxide, and characterized by a d50 average particle size in a range from 5 to 12 μm and a particle size span ((d90−d10)/d50) in a range from 0.7 to 1.7, can be characterized by an onset of pyrolysis temperature of less than or equal to 300° C. More often, the onset of pyrolysis temperature is less than or equal to 275° C., such as less than or equal to 250° C., less than or equal to 225° C., less than or equal to 200° C., less than or equal to 175° C., or less than or equal to 150° C. The onset of pyrolysis temperature is the temperature at which there is at least 2 wt. % conversion of polyethylene in a thermogravimetric analysis (TGA) test, as described herein.

Additionally or alternatively, the disclosed catalysts can be characterized by a 10% pyrolysis temperature of less than or equal to 375° C. More often, the 10% pyrolysis temperature is less than or equal to 350° C., less than or equal to 325° C., less than or equal to 300° C., or less than or equal to 275° C. The 10% pyrolysis temperature is the temperature at which there is at least 10 wt. % conversion of polyethylene in a TGA test, as described herein.

A catalyst composition is provided in another aspect of this invention, and the catalyst composition can comprise a catalyst comprising a solid oxide and/or a chemically-treated solid oxide, and a polyethylene, and wherein from 5 to 50 wt. % of the composition is the catalyst. As noted above, polyethylene encompasses—for instance—ethylene homopolymers and ethylene/α-olefin copolymers such as ethylene/1-butene copolymers, ethylene/1-hexene copolymers, ethylene/1-octene copolymers, and the like. Other suitable ranges for the amount of the catalyst, as a percentage of the total catalyst composition, include from 5 to 30 wt. %, from 5 to 20 wt. %, from 8 to 25 wt. %, from 10 to 40 wt. %, from 10 to 20 wt. %, from 15 to 50 wt. %, from 15 to 40 wt. %, or from 20 to 35 wt. %, and the like.

While not limited thereto, the catalyst composition can be in the form of a pellet or bead. Additionally or alternatively, the catalyst composition can be one in which the polyethylene encapsulates the catalyst.

Any suitable solid oxide and/or chemically-treated solid oxide can be utilized in the catalyst composition, such as those solid oxides and chemically-treated solid oxides disclosed hereinabove. For instance, when the catalyst composition comprises a solid oxide, the solid oxide can comprise a silica, an alumina, a titania, a zirconia, a magnesia, a boria, a zinc oxide, a silica-alumina, a silica-coated alumina, a silica-titania, a silica-zirconia, an alumina-titania, an alumina-zirconia, a zinc-aluminate, an alumina-boria, a silica-boria, an aluminum phosphate, an aluminophosphate, an aluminophosphate-silica, a titania-zirconia, and the like, as well as combinations thereof. In a particular aspect, the solid oxide can comprise a silica-coated alumina.

When the catalyst composition comprises a chemically-treated solid oxide, the chemically-treated solid oxide can comprise a fluorided solid oxide in one aspect, and the chemically-treated solid oxide can comprise a sulfated solid oxide in another aspect, and the chemically-treated solid oxide can comprise a fluorided alumina, a chlorided alumina, a bromided alumina, a sulfated alumina, a fluorided silica-alumina, a chlorided silica-alumina, a bromided silica-alumina, a sulfated silica-alumina, a fluorided silica-zirconia, a chlorided silica-zirconia, a bromided silica-zirconia, a sulfated silica-zirconia, a fluorided silica-titania, a fluorided silica-coated alumina, a fluorided-chlorided silica-coated alumina, a sulfated silica-coated alumina, a phosphated silica-coated alumina, and the like, as we as any combination thereof, in yet another aspect. For instance, the chemically-treated solid oxide in the catalyst composition can comprise a fluorided silica-coated alumina or a sulfated alumina (or a mixture thereof).

Optionally, in the catalyst composition with the polyethylene, the catalyst comprising a solid oxide and/or a chemically-treated solid oxide can be further characterized by any of the features of the solid catalyst disclosed hereinabove, such as particle size distribution features (e.g., d50 average particle size, particle size span ((d90−d10)/d50), ratio of d90/d10, d10 particle size, ratio of d90/d50, etc.), electron-withdrawing anion content of the chemically-treated solid oxide, pore volume, BET surface area, transition metal content of the catalyst, the onset of pyrolysis temperature, and/or the 10% pyrolysis temperature.

This invention further encompasses methods of making these catalyst compositions, such as, for example, by (1) melting a polyethylene in an inert atmosphere, (2) combining a catalyst comprising a solid oxide and/or a chemically-treated solid oxide with the polyethylene to form a mixture, and (3) cooling the mixture to form the catalyst composition.

Pyrolysis Processes

Pyrolysis processes also are encompassed herein. A representative pyrolysis process can comprise contacting a waste polyolefin (e.g., comprising polyethylene) with any of the catalysts (or any of the catalyst compositions) disclosed herein at a pyrolysis temperature to form a pyrolysis product containing $C_1$-$C_{10}$ hydrocarbons. In another aspect, a representative pyrolysis process can comprise contacting a waste polyolefin (e.g., comprising polyethylene) with a solid catalyst at a pyrolysis temperature to form a pyrolysis product containing $C_1$-$C_{10}$ hydrocarbons, and wherein the solid catalyst comprises a silica-coated alumina, a fluorided silica-coated alumina, and/or a sulfated alumina. In this aspect, the solid catalyst can comprise any combination of the silica-coated alumina, the fluorided silica-coated alumina, and the sulfated alumina; alternatively, the solid catalyst can comprise the silica-coated alumina; alternatively, the solid catalyst can comprise the fluorided silica-coated alumina; or alternatively, the solid catalyst can comprise the sulfated alumina.

The pyrolysis product produced by any of these pyrolysis processes can comprise any of the hydrocarbon compositions disclosed hereinabove, i.e., the first hydrocarbon composition, the second hydrocarbon composition, or the third hydrocarbon composition. Additionally or alternatively, the pyrolysis product (before fractionation) can be characterized by a molar amount of hydrogen to hydrocarbon product of less than or equal to 0.5 mol %, less than or equal to 0.4 mol %, less than or equal to 0.2 mol %, or less than or equal to 0.1 mol % in one aspect, while in another aspect, the pyrolysis product can be characterized by a molar amount of hydrogen to hydrocarbon product in a range from 1 to 4 mol %, from 1 to 3.5 mol %, from 1.5 to 3 mol %, or from 1.6 to 2.8 mol %.

The pyrolysis processes encompassed herein can be performed at any suitable pyrolysis temperature. Typical pyrolysis temperatures often can fall within a range from 150° C. to 600° C., and other illustrative ranges for the pyrolysis temperature include from 200° C. to 500° C., from 200° C. to 400° C., from 250° C. to 350° C., or from 300° C. to 450° C., and the like. Advantageously, many of the solid catalysts described herein allow a significant reduction in the pyrolysis temperature.

The pyrolysis process can be performed at any suitable pressure, such as at ambient pressure or at a pressure in a range from 10 psig to 200 psig, from 15 to 100 psig, or from 20 to 80 psig, and so forth. Likewise, the pyrolysis process can be performed in any suitable reactor, and representative reactor types include batch reactors, slurry reactors, gas-phase reactors (e.g., fluidized bed reactors), tubular reactors, and autoclave reactors, among others.

If desired, the pyrolysis product can be hydrogenated to form a saturated hydrocarbon product. Accordingly, the pyrolysis processes encompassed herein—optionally—can further comprise a step of hydrogenating the pyrolysis product. Any suitable hydrogenation catalysts, hydrogenation process conditions, and reactor types can be utilized.

EXAMPLES

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

BET surface areas can be determined using the BET nitrogen adsorption method of Brunauer et al., *J. Am. Chem. Soc.*, 60, 309 (1938) as described in ASTM D1993-91. Total pore volumes can be determined in accordance with Halsey, G. D., *J. Chem. Phys.* (1948), 16, pp. 931. Melt index (MI, g/10 min) can be determined in accordance with ASTM D1238 at 190° C. with a 2,160 gram weight. Density can be determined in grams per cubic centimeter ($g/cm^3$) on a compression molded sample, cooled at 15° C. per minute, and conditioned for 40 hours at room temperature in accordance with ASTM D1505 and ASTM D4703.

The catalyst of Example 1 was a fluorided silica-coated alumina containing 5 wt. % F, with a nominal BET surface area of 350 $m^2/g$, a nominal pore volume of 1.2 mL/g, a d50 average particle size of 8.7 µm, and a weight ratio of silica:alumina of 40:60. It was calcined in air at 600° C. for 3 hr. The d50 particle size, or median or average particle size, refers to the particle size for which 50% of the sample by volume has a smaller size and 50% of the sample has a larger size. The particle size distribution of the catalyst of Example 1 was determined using laser diffraction in accordance with ISO 13320. The results are shown graphically in FIG. 1 and summarized in Table 1 below. The catalyst of Example 1 was prepared by air classifying a fine particle size fluorided silica-coated alumina with the distribution of FIG. 1 and Table 1, from an original batch of the fluorided silica-coated alumina having a nominal d50 average particle size of 50 µm.

TABLE 1

| Particle size characterization of the catalyst of Example 1. Example 1 | |
| --- | --- |
| Mv, mean, µm | 9.32 |
| Mn, number avg, µm | 5.45 |
| MA, area mean, µm | 7.81 |

TABLE 1-continued

| Particle size characterization of the catalyst of Example 1. Example 1 | |
| --- | --- |
| CS, surface area | 0.769 |
| Std Dev, µm | 3.58 |
| Mz, graphic mean | 9.01 |
| σ1, graphic std. dev. | 3.71 |
| Ski, skewness | 0.22 |
| Kg, peakedness | 1.095 |
| D10, µm | 4.91 |
| D20, µm | 6.04 |
| D30, µm | 6.96 |
| D40, µm | 7.81 |
| D50, µm | 8.65 |
| D60, µm | 9.57 |
| D70, µm | 10.62 |
| D80, µm | 12.02 |
| D90, µm | 14.36 |
| D95, µm | 16.83 |
| D90/D10 | 2.92 |
| D90/D50 | 1.66 |
| Span | 1.09 |

The catalyst of Example 2 was a silica-coated alumina with a nominal BET surface area of 450 $m^2/g$, a nominal pore volume of 1.5 mL/g, a nominal d50 average particle size of 50 µm, and a weight ratio of silica:alumina of 40:60. It was calcined in air at 600° C. for 3 hr.

The catalyst of Example 3 was a Cr/silica-titania catalyst containing nominally 1 wt. % Cr and 4.2 wt. % Ti, with a nominal BET surface area of 500 $m^2/g$, a nominal pore volume of 2.5 mL/g, and a nominal d50 average particle size of 130 µm. Prior to use, the catalyst was calcined in air at 800-850° C. for 3 hr to form the chromium (VI)/silica-titania catalyst containing ~1 wt. % hexavalent Cr.

The catalyst of Example 4 was a fluorided silica-coated alumina containing 5 wt. % F, with a nominal BET surface area of 350 $m^2/g$, a nominal pore volume of 1.2 mL/g, a nominal d50 average particle size of 45 µm, and a weight ratio of silica:alumina of 40:60. It was calcined in air at 600° C. for 3 hr.

The catalyst of Example 5 was a sulfated alumina containing 15 wt. % sulfate, with a nominal BET surface area of 280 $m^2/g$, a nominal pore volume of 1.3 mL/g, and a nominal d50 average particle size of 100 µm. It was calcined at 600° C. for 3 hr.

The catalyst of Example 6 was a 13× zeolite with a nominal BET surface area of 650 $m^2/g$, a nominal pore volume of 0.13 mL/g, a nominal d50 average particle size of 15 µm, and an average pore diameter of approximately 10 Angstroms.

Pyrolysis experiments were performed as follows. A metallocene-based polyethylene (an ethylene/1-hexene copolymer) having a nominal melt index of 1 g/10 min and density of 0.918 g/cc was melted under nitrogen and then mixed with about 10-20 wt. % of the respective solid catalyst, still under nitrogen, followed by cooling to form a single large pellet. The pellet, with the solid catalyst effectively encapsulated with polyethylene, was then analyzed by static thermogravimetric analysis (TGA).

Thermogravimetric and evolved gas analysis was performed on a Mettler-Toledo TGA/DSC3+ equipped with a Pfeiffer ThermoStar® Gas Analysis System. Approximately 20 mg of sample was placed in a 70 µL alumina crucible. The protective gas through the balance was set to 40 mL/min of argon, and the reactive gas within the furnace was set to 40 mL/min of argon or 10 mL/min of oxygen. The sample was maintained at 30° C. for 15 min and heated to 750° C.

at 10° C./min. Off-gases were scanned for molecular fragments with mass-to-charge ratios of 1-150. The data was corrected for buoyancy artifacts by subtracting a blank curve with an empty crucible.

Figure 2:
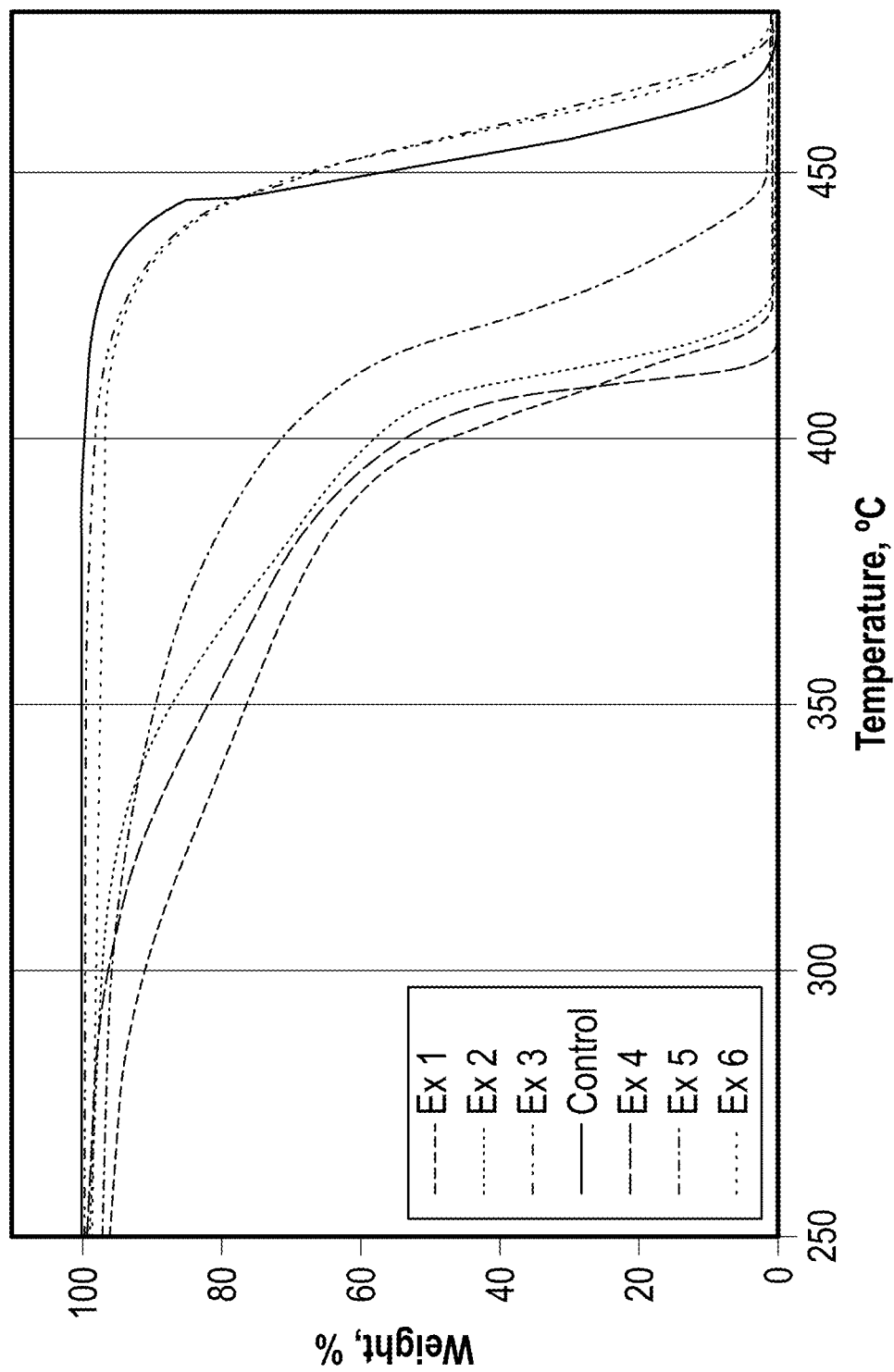
FIG. 2 presents a plot of the weight loss in a thermogravimetric analysis (TGA) test as a function of temperature for a Control Example and for the catalysts of Examples 1-6.

FIG. 2 illustrates the relative polymer weight loss from the TGA test during pyrolysis as a function of temperature for a Control Example (no catalyst) and for the catalysts of Examples 1-6. Table 2 summarizes the cumulative polymer weight loss during pyrolysis in the 150-500° C. range at 25° C. increments for the Control Example and for the catalysts of Examples 1-5. As shown by FIG. 2 and Table 2, the catalysts of Example 3 and Example 6 did not improve the pyrolysis reaction significantly over that of the Control Example (with no catalyst, polyethylene only). Unexpectedly, however, the catalysts of Examples 1-2 and 4-5 dramatically reduced the temperature at which the pyrolysis reaction was initiated and shifted complete pyrolysis (~99 wt. % cumulative weight loss) to much lower temperatures, when run under these conditions (e.g., atmosphere and ramp rate). For instance, complete pyrolysis with no catalyst was in the 475-500° C. range, whereas complete pyrolysis with the catalysts of Examples 1-2 and 4 occurred at approximately 425° C.

Moreover, the onset of pyrolysis (i.e., at least 2 wt. % conversion of polyethylene or at least 2 wt. % cumulative weight loss in the TGA test) was less than 200° C. for the catalysts of Examples 1 and 5 and around 300° C. for the catalysts of Examples 2 and 4. In contrast, the onset of pyrolysis was not until 425° C. when no catalyst was present. Likewise, the catalysts of Examples 1-2 and 4-5 had 10% pyrolysis temperatures (i.e., at least 10 wt. % conversion of polyethylene or at least 10 wt. % cumulative weight loss in the TGA test) in the 325-350° C. range, whereas with no catalyst, 10 wt. % loss did not occur until a temperature of 450° C. was reached.

Note that the temperature rise could have been stopped at any temperature after the initiation of pyrolysis, to allow for prolonged but complete reaction at the desired temperature. Note also that these experiments were performed under static conditions, in the absence of mechanical mixing. Increased mixing would undoubtedly have accelerated the decomposition at each temperature.

The amount of hydrogen produced during the pyrolysis reaction varied depending upon the catalyst. Table 3 summarizes the molar ratio of hydrogen ($H_2$) to hydrocarbon produced in the pyrolysis of polyethylene for each catalyst, and for the Control Example with no catalyst. Interestingly, the catalysts of Examples 2 and 4-6 produced a similar amount of hydrogen to the Control or an amount less than the Control, whereas the catalysts of Examples 1 and 3 produced significantly more hydrogen.

TABLE 3

Hydrogen to hydrocarbon molar ratio produced in the pyrolysis of polyethylene using no catalyst or the catalysts of Examples 1-6.

| Example | 1 | 2 | 3 | Control | 4 | 5 | 6 |
|---|---|---|---|---|---|---|---|
| $H_2$ to hydrocarbon molar ratio | 1.7 | 0.1 | 2.7 | 0.1 | 0.02 | 0.3 | 0.1 |

Likewise, the distribution of hydrocarbons (e.g., alkenes) also varied significantly based on the catalyst used, as well as on the pyrolysis temperature. Representative Table 4 shows the variation in products as detected by the gas analysis system formed during the pyrolysis reaction of polyethylene described above using the catalyst of Example 1 under at the temperatures noted. Note that generally lower temperatures produce higher carbon numbers and less methane. Aromatic compounds were not detected in these experiments.

TABLE 4

Pyrolysis product distribution (mol %) using the catalyst of Example 1 at three different temperatures.

| Temp | Methane | Ethane | Propane | Butane | Pentane | Hexane | Heptane | Octane | Nonane | Decane |
|---|---|---|---|---|---|---|---|---|---|---|
| 249° C. | 1.3% | 28.8% | 47.0% | 12.3% | 4.1% | 2.4% | 0.8% | 1.0% | 1.1% | 1.2% |
| 321° C. | 6.0% | 28.1% | 45.6% | 12.9% | 3.8% | 1.9% | 1.0% | 0.5% | 0.1% | 0.1% |
| 411° C. | 7.5% | 37.7% | 32.5% | 13.9% | 4.6% | 2.2% | 0.7% | 0.3% | 0.2% | 0.3% |

TABLE 2

TGA cumulative pyrolysis weight loss (wt. %) for the Control Example and for the catalysts of Examples 1-5.

| Example Temp (° C.) | 1 | 2 | 3 | Control | 4 | 5 |
|---|---|---|---|---|---|---|
| | Cumulative Pyrolysis Weight Loss (wt. %) | | | | | |
| 150 | 2.20 | 0.64 | 0.21 | −0.10 | 0.36 | 1.65 |
| 175 | 2.45 | 0.70 | 0.21 | −0.11 | 0.44 | 1.91 |
| 200 | 2.72 | 0.77 | 0.23 | −0.12 | 0.52 | 2.20 |
| 225 | 3.13 | 0.87 | 0.25 | −0.13 | 0.61 | 2.51 |
| 250 | 3.96 | 1.10 | 0.28 | −0.11 | 0.84 | 2.85 |
| 275 | 5.46 | 1.68 | 0.33 | −0.05 | 1.56 | 3.36 |
| 300 | 8.99 | 2.93 | 0.39 | −0.11 | 3.71 | 4.41 |
| 325 | 15.89 | 5.73 | 0.46 | −0.08 | 8.96 | 6.65 |
| 350 | 23.82 | 12.81 | 0.59 | −0.04 | 18.14 | 10.56 |
| 375 | 32.10 | 26.17 | 0.89 | 0.07 | 28.18 | 16.91 |
| 400 | 52.72 | 42.19 | 1.87 | 0.39 | 46.52 | 28.87 |
| 425 | 99.22 | 98.35 | 5.85 | 2.28 | 99.89 | 66.84 |
| 450 | 99.48 | 99.86 | 33.58 | 43.70 | 99.91 | 98.45 |
| 475 | 99.57 | 99.89 | 98.67 | 99.86 | 99.89 | 98.87 |
| 500 | 99.66 | 99.91 | 99.93 | 99.94 | 99.93 | 99.02 |

Examples 7-29 are summarized in Table 5. This is a summary table of hydrocarbon product distributions (mol %) produced during these TGA experiments at various temperatures from the pyrolysis reaction of polyethylene, using either no catalyst or the catalysts of Examples 1-5. Substantially all of the hydrocarbons were alkenes (>98 mol %, excluding methane) and less than 0.5 mol % were aromatics.

Unexpectedly, and beneficially, many of the hydrocarbon compositions in Table 5 have desirable product distributions. For instance, the compositions of Examples 7-12, 15, 20, 22, and 27 contained from 45 to 65 mol % $C_3$-$C_4$ hydrocarbons and less than or equal to 12 mol % methane. Additionally, the compositions of Examples 14, 23, and 29 contained from 40 to 60 mol % $C_5$-$C_8$ hydrocarbons and less than or equal to 6 mol % methane. Lastly, the compositions of Examples 14, 23, and 27-29 contained from 15 to 30 mol % $C_9$-$C_{10}$ hydrocarbons and less than or equal to 6 mol % methane.

TABLE 5

Prolysis product distributions (mol %) of Examples 7-29 using the catalysts of Examples 1-5 at various pyrolysis temperatures.

| Example | Catalyst | Temp. | $C_1$ | $C_2$ | $C_3$-$C_4$ | $C_5$-$C_8$ | $C_9$-$C_{10}$ |
|---|---|---|---|---|---|---|---|
| 7 | 1 | 249° C. | 1.3% | 28.8% | 59.4% | 8.3% | 2.3% |
| 8 | 1 | 321° C. | 6.0% | 28.1% | 58.5% | 7.2% | 0.2% |
| 9 | 1 | 411° C. | 7.5% | 37.7% | 46.4% | 7.9% | 0.5% |
| 10 | 2 | 363° C. | 6.1% | 24.9% | 61.9% | 6.6% | 0.5% |
| 11 | 2 | 388° C. | 5.6% | 34.1% | 51.3% | 8.6% | 0.3% |
| 12 | 2 | 406° C. | 3.9% | 34.6% | 52.0% | 9.1% | 0.4% |
| 13 | 2 | 420° C. | 8.4% | 43.1% | 33.5% | 11.9% | 3.1% |
| 14 | 3 | 349° C. | 2.1% | 6.0% | 16.7% | 56.0% | 19.2% |
| 15 | 3 | 400° C. | 9.4% | 29.3% | 50.9% | 9.9% | 0.5% |
| 16 | 3 | 461° C. | 22.9% | 29.5% | 41.8% | 5.7% | 0.1% |
| 17 | Control | 400° C. | 5.1% | 55.0% | 32.7% | 2.7% | 4.4% |
| 18 | Control | 445° C. | 13.8% | 34.4% | 45.8% | 5.7% | 0.2% |
| 19 | Control | 500° C. | 16.8% | 42.1% | 27.7% | 11.1% | 2.2% |
| 20 | 4 | 301° C. | 11.2% | 35.9% | 48.1% | 4.0% | 0.8% |
| 21 | 4 | 350° C. | 18.4% | 32.4% | 42.0% | 6.7% | 0.5% |
| 22 | 4 | 410° C. | 10.7% | 29.9% | 51.2% | 7.9% | 0.3% |
| 23 | 5 | 301° C. | 4.2% | 8.3% | 18.9% | 45.7% | 22.9% |
| 24 | 5 | 350° C. | 39.6% | 5.3% | 31.5% | 16.3% | 7.3% |
| 25 | 5 | 421° C. | 22.8% | 36.5% | 35.0% | 5.5% | 0.2% |
| 26 | 5 | 444° C. | 28.5% | 34.8% | 29.0% | 6.3% | 1.5% |
| 27 | 1 | <350° C. | 1.4% | 2.5% | 46.0% | 30.8% | 19.3% |
| 28 | 1 | 350° C. | 1.6% | 3.0% | 35.1% | 36.9% | 23.5% |
| 29 | 1 | >350° C. | 1.7% | 3.5% | 30.2% | 39.8% | 24.8% |

Figure 3:
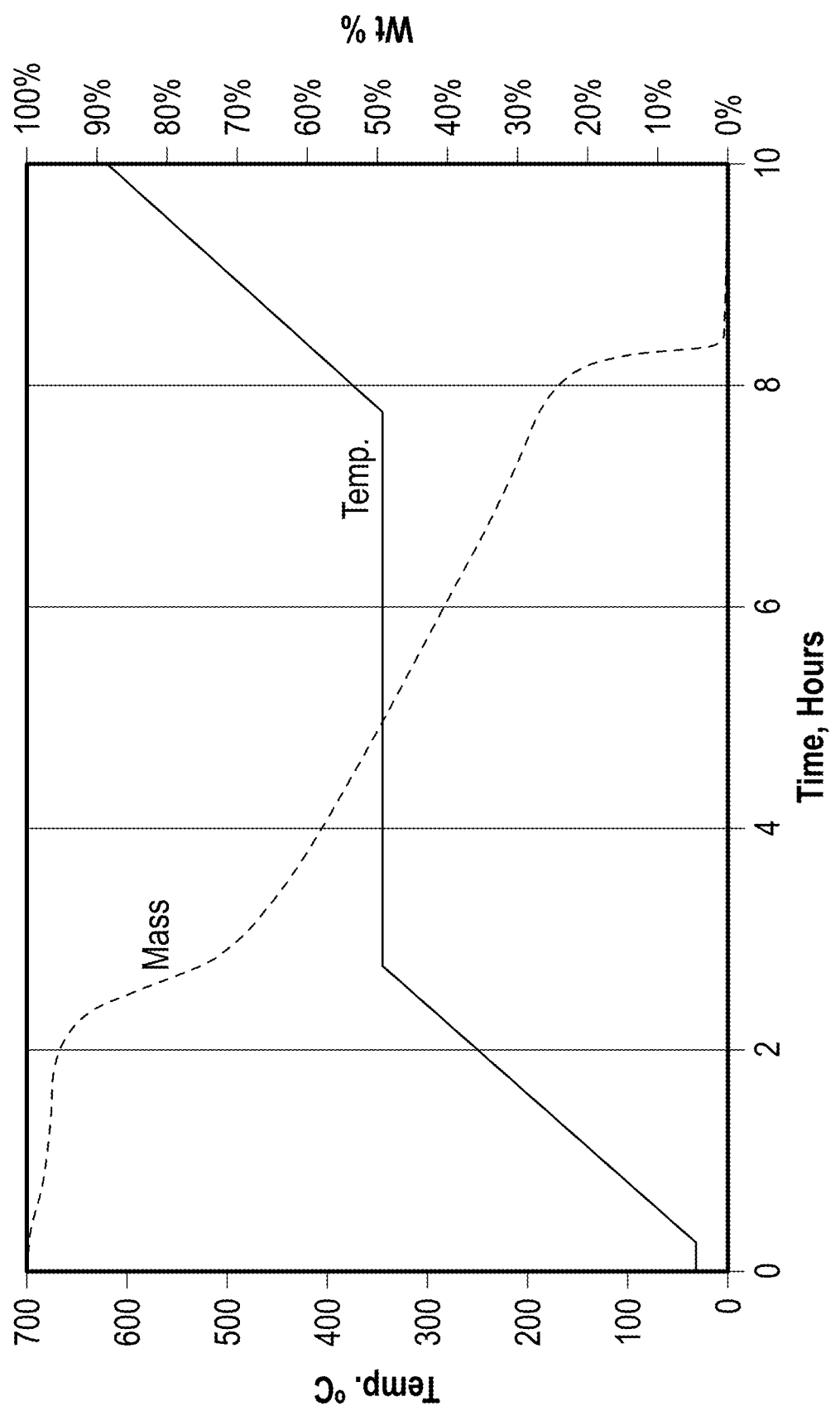
FIG. 3 presents a plot of the weight loss in a thermogravimetric analysis (TGA) test as a function of temperature, with an isothermal hold at 345° C., for the catalyst of Example 1.

For Example 30, using the catalyst of Example 1, the temperature was ramped up in the usual way, except to only 345° C. It was held at this temperature for about 5 hr, then the ramp was continued in the usual way up to about 600° C. (see FIG. 3). At this hold temperature, the pyrolysis reaction continued. The loss in mass at the hold temperature is illustrated in FIG. 3. During this hold time at 345° C., 48.6 wt. % of the polymer mass was lost due to pyrolysis, despite the low temperature and lack of mixing.

The product composition obtained during this isothermal hold period is shown in Table 6. Also shown in the table for comparison are the average products obtained during the initial temperature rise up to 345° C., and then the average products obtained during the final rise up to 600° C. As demonstrated in Table 6, to obtain products in the $C_3$-$C_6$ range, lower temperatures are preferred, such as this isothermal hold period. Of course, the hold period could have been done at any temperature higher than the onset of pyrolysis temperature.

TABLE 6

Pyrolysis product distributions (mol %) of Example 30 using the catalyst of Example 1 at various pyrolysis temperatures.

| Example | Low T Average | Isothermal | High T Average |
|---|---|---|---|
| $C_1$ | 6% | 7% | 8% |
| $C_2$ | 5% | 7% | 8% |
| $C_3$ | 43% | 31% | 27% |
| $C_4$ | 16% | 17% | 15% |
| $C_5$ | 7% | 9% | 9% |

TABLE 6-continued

Pyrolysis product distributions (mol %) of Example 30 using the catalyst of Example 1 at various pyrolysis temperatures.

| Example | Low T Average | Isothermal | High T Average |
|---|---|---|---|
| $C_6$ | 5% | 7% | 8% |
| $C_7$ | 5% | 6% | 7% |
| $C_8$ | 4% | 6% | 6% |
| $C_9$ | 4% | 6% | 6% |
| $C_{10}$ | 4% | 6% | 6% |
| Total | 100% | 100% | 100% |

The invention is described herein with reference to numerous aspects and specific examples. Many variations will suggest themselves to those skilled in the art in light of the detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A hydrocarbon composition (e.g., a LNG composition) comprising from 45 to 70 mol % $C_3$-$C_4$ hydrocarbons and less than or equal to 12 mol % methane.

Aspect 2. The composition defined in aspect 1, wherein the composition comprises an amount of $C_3$-$C_4$ hydrocarbons in any suitable range or any range disclosed herein, e.g., from 46 to 68 mol %, from 48 to 67 mol %, from 50 to 65 mol %, or from 50 to 62 mol % $C_3$-$C_4$ hydrocarbons.

Aspect 3. The composition defined in aspect 1 or 2, wherein the composition comprises an amount of methane in any suitable range or any range disclosed herein, e.g., less than or equal to 10 mol %, less than or equal to 8 mol %, less than or equal to 6 mol %, from 0.5 to 11 mol %, from 1 to 11 mol %, or from 1 to 8 mol % methane.

Aspect 4. The composition defined in any one of aspects 1-3, wherein the composition further comprises an amount of $C_9$-$C_{10}$ hydrocarbons in any suitable range or any range disclosed herein, e.g., less than or equal to 5 mol %, less than or equal to 3 mol %, less than or equal to 2 mol %, or less than or equal to 1 mol % $C_9$-$C_{10}$ hydrocarbons.

Aspect 5. The composition defined in any one of aspects 1-4, wherein the composition further comprises an amount of $C_5$-$C_8$ hydrocarbons in any suitable range or any range disclosed herein, e.g., from 4 to 12 mol %, from 5 to 11 mol %, or from 6 to 10 mol % $C_5$-$C_8$ hydrocarbons.

Aspect 6. The composition defined in any one of aspects 1-5, wherein the composition further comprises an amount of $C_2$ hydrocarbons in any suitable range or any range disclosed herein, e.g., from 22 to 39 mol %, from 23 to 38 mol %, from 24 to 37 mol %, or from 25 to 36 mol % $C_2$ hydrocarbons.

Aspect 7. A hydrocarbon composition (e.g., a gasoline composition) comprising from 40 to 60 mol % $C_5$-$C_8$ hydrocarbons and less than or equal to 6 mol % methane.

Aspect 8. The composition defined in aspect 7, wherein the composition comprises an amount of $C_5$-$C_8$ hydrocarbons in any suitable range or any range disclosed herein, e.g., from 40 to 58 mol %, from 42 to 60 mol %, from 42 to 58 mol %, or from 45 to 57 mol % $C_5$-$C_8$ hydrocarbons.

Aspect 9. The composition defined in aspect 7 or 8, wherein the composition comprises an amount of methane in any suitable range or any range disclosed herein, e.g., less than or equal to 5 mol %, less than or equal to 4 mol %, less than or equal to 3 mol %, from 0.5 to 6 mol %, from 1 to 6 mol %, or from 1 to 5 mol % methane.

Aspect 10. The composition defined in any one of aspects 7-9, wherein the composition further comprises an amount of $C_2$ hydrocarbons in any suitable range or any range disclosed herein, e.g., from 1 to 12 mol %, from 2 to 10 mol %, from 3 to 10 mol %, or from 4 to 9 mol % $C_2$ hydrocarbons.

Aspect 11. The composition defined in any one of aspects 7-10, wherein the composition further comprises an amount of $C_9$-$C_{10}$ hydrocarbons in any suitable range or any range disclosed herein, e.g., from 15 to 30 mol %, from 17 to 28 mol %, from 17 to 27 mol %, or from 18 to 25 mol % $C_9$-$C_{10}$ hydrocarbons.

Aspect 12. The composition defined in any one of aspects 7-11, wherein the composition further comprises an amount of $C_3$-$C_4$ hydrocarbons in any suitable range or any range disclosed herein, e.g., from 12 to 31 mol %, from 15 to 22 mol %, or from 15 to 20 mol % $C_3$-$C_4$ hydrocarbons.

Aspect 13. A hydrocarbon composition (e.g., an aviation fuel composition) comprising from 15 to 30 mol % $C_9$-$C_{10}$ hydrocarbons and less than or equal to 6 mol % methane.

Aspect 14. The composition defined in aspect 13, wherein the composition comprises an amount of $C_9$-$C_{10}$ hydrocarbons in any suitable range or any range disclosed herein, e.g., from 16 to 29 mol %, from 17 to 28 mol %, from 17 to 27 mol %, or from 18 to 25 mol % $C_9$-$C_{10}$ hydrocarbons.

Aspect 15. The composition defined in aspect 13 or 14, wherein the composition comprises an amount of methane in any suitable range or any range disclosed herein, e.g., less than or equal to 5 mol %, less than or equal to 4 mol %, less than or equal to 3 mol %, from 0.5 to 6 mol %, from 0.5 to 5 mol %, or from 1 to 4 mol % methane.

Aspect 16. The composition defined in any one of aspects 13-15, wherein the composition further comprises an amount of $C_2$ hydrocarbons in any suitable range or any range disclosed herein, e.g., from 1 to 12 mol %, from 1 to 10 mol %, from 2 to 9 mol %, or from 2 to 8 mol % $C_2$ hydrocarbons.

Aspect 17. The composition defined in any one of aspects 13-16, wherein the composition further comprises an amount of $C_3$-$C_4$ hydrocarbons in any suitable range or any range disclosed herein, e.g., from 15 to 50 mol %, from 15 to 48 mol %, or from 16 to 46 mol % $C_3$-$C_4$ hydrocarbons.

Aspect 18. The composition defined in any one of aspects 13-17, wherein the composition further comprises an amount of $C_5$-$C_8$ hydrocarbons in any suitable range or any range disclosed herein, e.g., from 25 to 60 mol %, from 28 to 58 mol %, or from 30 to 56 mol % $C_5$-$C_8$ hydrocarbons.

Aspect 19. The composition defined in any one of aspects 1-18, wherein other than methane, the composition comprises an amount of alkenes (e.g., mono-alkenes or di-alkenes) in any suitable range or any range disclosed herein, e.g., at least 85 mol %, at least 90 mol %, at least 95 mol %, at least 97 mol %, at least 98 mol %, or at least 99 mol % alkenes.

Aspect 20. The composition defined in any one of aspects 1-19, wherein the composition comprises an amount of aromatic compounds in any suitable range or any range disclosed herein, e.g., less than or equal to 2 mol %, less than or equal to 1 mol %, less than or equal to 0.5 mol %, or less than or equal to 0.1 mol % aromatic compounds.

Aspect 21. A catalyst comprising a solid oxide and/or a chemically-treated solid oxide, the catalyst characterized by a d50 average particle size in a range from 5 to 12 µm and a particle size span ((d90−d10)/d50) in a range from 0.7 to 1.7.

Aspect 22. The catalyst defined in aspect 21, wherein the d50 average particle size is in any suitable range or in any range disclosed herein, e.g., from 5 to 11 µm, from 6 to 12 µm, from 6 to 11 µm, from 7 to 10 µm, or from 8 to 9 µm.

Aspect 23. The catalyst defined in aspect 21 or 22, wherein the particle size span is in any suitable range or in any range disclosed herein, e.g., from 0.7 to 1.5, from 0.8 to 1.4, from 0.9 to 1.3, or from 1 to 1.2.

Aspect 24. The catalyst defined in any one of aspects 21-23, wherein the catalyst has a ratio of d90/d10 in any suitable range or any range disclosed herein, e.g., from 2 to 5, from 2 to 4, from 2.5 to 4, or from 2.5 to 3.5.

Aspect 25. The catalyst defined in any one of aspects 21-24, wherein the catalyst has any suitable d10 particle size or a d10 particle size in any range disclosed herein, e.g., from 2 to 8 µm, from 3 to 7 µm, from 4 to 6 µm, or from 4.5 to 5.5 µm.

Aspect 26. The catalyst defined in any one of aspects 21-25, wherein the catalyst has any suitable ratio of d90/d50 or a ratio in any range disclosed herein, e.g., from 1.2 to 4, from 1.3 to 3, from 1.4 to 2.5, from 1.4 to 2, or from 1.5 to 1.9.

Aspect 27. The catalyst defined in any one of aspects 21-26, wherein the catalyst comprises a silica-coated alumina.

Aspect 28. The catalyst defined in any one of aspects 21-27, wherein the catalyst comprises a fluorided solid oxide and/or a sulfated solid oxide.

Aspect 29. The catalyst defined in any one of aspects 21-28, wherein the catalyst comprises a fluorided silica-coated alumina and/or a sulfated alumina.

Aspect 30. The catalyst defined in any one of aspects 27-29, wherein the silica-coated alumina has any suitable amount of silica or an amount in any range disclosed herein, e.g., from 10 to 60 wt. %, from 10 to 40 wt. %, from 20 to 50 wt. %, or from 20 to 35 wt. %, based on the total weight of the silica-coated alumina.

Aspect 31. The catalyst defined in any one of aspects 21-30, wherein the chemically-treated solid oxide contains any suitable amount of the electron-withdrawing anion or an amount in any range disclosed herein, e.g., from 1 to 25 wt. %, from 2 to 20 wt. %, from 3 to 15 wt. %, from 3 to 12 wt. %, or from 4 to 10 wt. % of the electron-withdrawing anion, based on the total weight of the chemically-treated solid oxide.

Aspect 32. The catalyst defined in any one of aspects 21-31, wherein the catalyst has a pore volume in any suitable range or any range disclosed herein, e.g., from 0.4 to 2.5 mL/g, from 0.5 to 2 mL/g, from 0.7 to 1.8 mL/g, or from 1 to 2 mL/g.

Aspect 33. The catalyst defined in any one of aspects 21-32, wherein the catalyst has a BET surface area in any suitable range or any range disclosed herein, e.g., from 150 to 800 $m^2$/g, from 200 to 600 $m^2$/g, from 200 to 400 $m^2$/g, or from 250 to 500 $m^2$/g.

Aspect 34. The catalyst defined in any one of aspects 21-33, wherein the catalyst has a d50 average particle size in any suitable range or any range disclosed herein, e.g., from 5 to 150 µm, from 5 to 50 µm, from 5 to 15 µm, from 10 to 100 µm, or from 10 to 40 µm.

Aspect 35. The catalyst defined in any one of aspects 21-34, wherein the catalyst further comprises any suitable amount of nickel (or cobalt) or an amount in any range disclosed herein, e.g., from 0.1 to 15 wt. %, from 0.2 to 10 wt. %, or from 0.5 to 5 wt. %.

Aspect 36. The catalyst defined in any one of aspects 21-35, wherein the catalyst is characterized by an onset of pyrolysis temperature in any suitable range or in any range disclosed herein, e.g., less than or equal to 300° C., less than or equal to 275° C., less than or equal to 250° C., less than or equal to 225° C., less than or equal to 200° C., less than or equal to 175° C., or less than or equal to 150° C. (the onset of pyrolysis temperature is the temperature at which there is at least 2 wt. % conversion of polyethylene in the TGA test described herein).

Aspect 37. The catalyst defined in any one of aspects 21-36, wherein the catalyst is characterized by a 10% pyrolysis temperature in any suitable range or in any range disclosed herein, e.g., less than or equal to 375° C., less than or equal to 350° C., less than or equal to 325° C., less than or equal to 300° C., or less than or equal to 275° C. (the 10% pyrolysis temperature is the temperature at which there is at least 10 wt. % conversion of polyethylene in the TGA test described herein).

Aspect 38. A catalyst composition comprising a catalyst comprising a solid oxide and/or a chemically-treated solid oxide and a polyethylene, wherein from 5 to 50 wt. % of the composition is the catalyst.

Aspect 39. The composition defined in aspect 38, wherein the catalyst composition is in the form of a pellet or bead.

Aspect 40. The composition defined in aspect 38 or 39, wherein the polyethylene encapsulates the catalyst.

Aspect 41. The composition defined in any one of aspects 38-40, wherein the catalyst is any suitable percentage of the composition or a percentage in any range disclosed herein, e.g., from 5 to 30 wt. %, from 5 to 20 wt. %, from 8 to 25 wt. %, from 10 to 40 wt. %, from 10 to 20 wt. %, from 15 to 50 wt. %, from 15 to 40 wt. %, or from 20 to 35 wt. %, based on the total weight of the composition.

Aspect 42. The composition defined in any one of aspects 38-41, wherein the solid oxide comprises a silica, an alumina, a titania, a zirconia, a magnesia, a boria, a zinc oxide, a silica-alumina, a silica-coated alumina, a silica-titania, a silica-zirconia, an alumina-titania, an alumina-zirconia, a zinc-aluminate, an alumina-boria, a silica-boria, an aluminum phosphate, an aluminophosphate, an aluminophosphate-silica, a titania-zirconia, or a combination thereof.

Aspect 43. The composition defined in any one of aspects 38-42, wherein the solid oxide comprises a silica-coated alumina.

Aspect 44. The composition defined in any one of aspects 38-43, wherein the chemically-treated solid oxide comprises a fluorided solid oxide.

Aspect 45. The composition defined in any one of aspects 38-44, wherein the chemically-treated solid oxide comprises a sulfated solid oxide.

Aspect 46. The composition defined in any one of aspects 38-45, wherein the chemically-treated solid oxide comprises a fluorided alumina, a chlorided alumina, a bromided alumina, a sulfated alumina, a fluorided silica-alumina, a chlorided silica-alumina, a bromided silica-alumina, a sulfated silica-alumina, a fluorided silica-zirconia, a chlorided silica-zirconia, a bromided silica-zirconia, a sulfated silica-zirconia, a fluorided silica-titania, a fluorided silica-coated alumina, a fluorided-chlorided silica-coated alumina, a sulfated silica-coated alumina, a phosphated silica-coated alumina, or any combination thereof.

Aspect 47. The composition defined in any one of aspects 38-46, wherein the chemically-treated solid oxide comprises a fluorided silica-coated alumina and/or a sulfated alumina.

Aspect 48. The composition defined in any one of aspects 38-47, wherein the catalyst is further characterized by the features defined in any one of aspects 21-37.

Aspect 49. A pyrolysis process comprising contacting a waste polyolefin with the catalyst defined in any one of aspects 21-37 at a pyrolysis temperature to form a pyrolysis product containing $C_1$-$C_{10}$ hydrocarbons.

Aspect 50. A pyrolysis process comprising contacting a waste polyolefin with the catalyst defined in any one of aspects 38-48 at a pyrolysis temperature to form a pyrolysis product containing $C_1$-$C_{10}$ hydrocarbons.

Aspect 51. A pyrolysis process comprising contacting a waste polyolefin with a solid catalyst at a pyrolysis temperature to form a pyrolysis product containing $C_1$-$C_{10}$ hydrocarbons, wherein the solid catalyst comprises a silica-coated alumina, a fluorided silica-coated alumina, and/or a sulfated alumina.

Aspect 52. The process defined in any one of aspects 49-51, wherein the pyrolysis product comprises the hydrocarbon composition defined in any one of aspects 1-20.

Aspect 53. The process defined in any one of aspects 49-52, wherein the pyrolysis temperature is any suitable temperature or a temperature in any range disclosed herein, e.g., from 150° C. to 600° C., from 200° C. to 500° C., from 200° C. to 400° C., from 250° C. to 350° C., or from 300° C. to 450° C.

Aspect 54. The process defined in any one of aspects 51-53, wherein the solid catalyst is further characterized by the features defined in any one of aspects 21-48.

Aspect 55. The process defined in any one of aspects 51-54, wherein the solid catalyst comprises the silica-coated alumina.

Aspect 56. The process defined in any one of aspects 51-55, wherein the solid catalyst comprises the fluorided silica-coated alumina.

Aspect 57. The process defined in any one of aspects 51-56, wherein the solid catalyst comprises the sulfated alumina.

Aspect 58. The process defined in any one of aspects 49-57, further comprising a step of hydrogenating the pyrolysis product.

Aspect 59. The process defined in any one of aspects 49-58, wherein the pyrolysis product before fractionation has (or is characterized by) a molar amount of hydrogen to hydrocarbon product in any suitable range or any range disclosed herein, e.g., less than or equal to 0.5 mol %, less than or equal to 0.4 mol %, less than or equal to 0.2 mol 9%, less than or equal to 0.1 mol %, from 1 to 4 mol %, from 1 to 3.5 mol %, from 1.5 to 3 mol %, or from 1.6 to 2.8 mol %.

Aspect 60. A method of making a catalyst composition, the method comprising (1) melting a polyethylene in an inert atmosphere, (2) combining a catalyst comprising a solid oxide and/or a chemically-treated solid oxide with the polyethylene to form a mixture, and (3) cooling the mixture to form the catalyst composition.

Aspect 61. The method defined in aspect 60, wherein the catalyst composition produced is further characterized by the features defined in any one of aspects 38-48.

Aspect 62. The process defined in any one of aspects 49-59, wherein the waste polyolefin comprises a mixture of olefin homopolymers, copolymers, and/or terpolymers.

Aspect 63. The process defined in any one of aspects 49-59, wherein the waste polyolefin comprises a mixture of polyethylene homopolymers, polypropylene homopolymers, polyethylene copolymers, polypropylene copolymers, and/or polyethylene terpolymers.

Aspect 64. The process defined in any one of aspects 49-59, wherein the waste polyolefin comprises mixture of a polyethylene and a polypropylene.

Aspect 65. The process defined in any one of aspects 49-59, wherein the waste polyolefin comprises a polyethylene.

What is claimed is:

1. A catalyst comprising a sulfated solid oxide, the catalyst characterized by:
   a d50 average particle size in a range from 5 to 12 µm; and
   a particle size span ((d90−d10)/d50) in a range from 0.7 to 1.7.

2. The catalyst of claim 1, wherein the catalyst is further characterized by:
   a d10 particle size in a range from 2 to 8 µm;
   a ratio of d90/d10 in a range from 2 to 5;
   a ratio of d90/d50 in a range from 1.4 to 2; or
   any combination thereof.

3. The catalyst of claim 1, wherein the sulfated solid oxide comprises a sulfated alumina.

4. The catalyst of claim 1, wherein the catalyst is further characterized by:
   an onset of pyrolysis temperature of less than or equal to 275° C.; and/or
   a 10% pyrolysis temperature of less than or equal to 350° C., wherein the 10% pyrolysis temperature is a temperature at which there is at least 10 wt. % conversion of polyethylene in a TGA test.

5. A pyrolysis process comprising:
   contacting a waste polyolefin with the catalyst of claim 1 at a pyrolysis temperature to form a pyrolysis product containing $C_1$-$C_{10}$ hydrocarbons.

6. The catalyst of claim 1, wherein the catalyst is further characterized by a d10 particle size in a range from 4 to 6 µm.

7. The catalyst of claim 1, wherein the catalyst is further characterized by a ratio of d90/d10 in a range from 2 to 4.

8. The catalyst of claim 1, wherein the catalyst is further characterized by a ratio of d90/d50 in a range from 1.4 to 2.

9. The catalyst of claim 1, wherein the sulfated solid oxide contains from 1 to 25 wt. % of sulfate, based on the total weight of the sulfated solid oxide.

10. The catalyst of claim 1, wherein the catalyst is further characterized by:
    a pore volume from 0.4 to 2.5 mL/g; and
    a BET surface area from 150 to 800 $m^2$/g.

11. The catalyst of claim 1, wherein:
    the d50 average particle size is in a range from 6 to 11 µm; and
    the particle size span ((d90−d10)/d50) is in a range from 0.8 to 1.4.

12. The catalyst of claim 1, wherein:
    the sulfated solid oxide comprises a sulfated alumina; and
    the particle size span ((d90−d10)/d50) is in a range from 0.7 to 1.5.

13. The catalyst of claim 12, wherein the d50 average particle size is in a range from 6 to 12 µm.

14. The catalyst of claim 12, wherein the catalyst is further characterized by a d10 particle size in a range from 3 to 7 µm.

15. The catalyst of claim 12, wherein the catalyst is further characterized by a ratio of d90/d10 in a range from 2 to 5.

16. The catalyst of claim 12, wherein the catalyst is further characterized by a ratio of d90/d50 in a range from 1.5 to 1.9.

17. The catalyst of claim 12, wherein the catalyst is further characterized by an onset of pyrolysis temperature of less than or equal to 275° C.

18. The catalyst of claim 12, wherein the catalyst is further characterized by a 10% pyrolysis temperature of less than or equal to 350° C., wherein the 10% pyrolysis temperature is a temperature at which there is at least 10 wt. % conversion of polyethylene in a TGA test.

19. The catalyst of claim 12, wherein the sulfated alumina contains from 2 to 20 wt. % of sulfate, based on the total weight of the sulfated alumina.

20. A pyrolysis process comprising:
    contacting a waste polyolefin with the catalyst of claim 12 at a pyrolysis temperature to form a pyrolysis product containing $C_1$-$C_{10}$ hydrocarbons.

* * * * *